United States Patent [19]
Choi

[11] Patent Number: 5,572,629
[45] Date of Patent: Nov. 5, 1996

[54] HIGH PERFORMANCE FUZZY LOGIC PROCESSING METHOD

[75] Inventor: Sung-kuk Choi, Seoul, Rep. of Korea

[73] Assignee: Samsung Aerospace Industries, Ltd., Kyeongsangnam-do, Rep. of Korea

[21] Appl. No.: 175,274

[22] Filed: Dec. 29, 1993

[30] Foreign Application Priority Data

Dec. 30, 1992 [KR] Rep. of Korea ............. 92-26739

[51] Int. Cl.$^6$ ................................................. G06F 15/46
[52] U.S. Cl. .................................... 395/61; 395/51
[58] Field of Search .............................. 395/61, 51

Primary Examiner—Robert W. Downs
Assistant Examiner—A. Katbab

Attorney, Agent, or Firm—Finnegan, Henderson, Farabow, Garrett & Dunner, L.L.P.

[57] ABSTRACT

A Fuzzy inference method for improving Fuzzy inference speed, by Max-process of rule contributions (RC) of Fuzzy control rules to avoid overlapping calculation when multiple control rules establish a common Fuzzy label, comprising receiving data of every channels of condition part, determining condition memberships of every data, determining RC of Fuzzy control rules in accordance with every labels by selecting minimum value among the condition memberships of, Max-processing by comparing and selecting maximum value among the RC's of every labels, repeating this operation for each Fuzzy control rule, determining a conclusion membership function in accordance with final RC of every label, and determining a final conclusion membership function by using the conclusion membership function.

3 Claims, 5 Drawing Sheets

"PRIOR ART" FIG. 1A, FIG. 1B, FIG. 1N

A FINAL RC OF A CERTAIN FUZZY LABEL

MAX-PROCESSING

HIGH PERFORMANCE FUZZY LOGIC PROCESSING METHOD

BACKGROUND OF THE INVENTION

1. Field of the Invention

The present invention relates generally to a high performance Fuzzy Logic processing method, and more particularly to a method that improves Fuzzy inference speed by Max-operation of rule contributions of Fuzzy control rules to avoid redundant calculation.

2. Description of Related Art

An automatic controller actuates a controlled system by maintaining an error between a desired value and output value to be as small as possible. Types of controllers include a PID (Proportional Integral-Derivative) controller, an Optimal Controller, an Adaptive controller, a Variable Structure System (VSS) and a Neural Network.

Fuzzy control theory was introduced when Prof. Zadeh of the United States contributed an article to "Information & Control" in 1965. Although Fuzzy theory was initially treated with indifference, it began to attract public attention in 1974 when Prof. Mamdani of Great Britain obtained good results by applying Fuzzy theory to a steam engine that failed to realize an anticipated result with a generally known PID controller and Optimal controller.

Fuzzy control determines a proper manipulated variable for an input through Fuzzy inference by representing a skilled operator's experience with Fuzzy sets and control rules. A Fuzzy logic for Fuzzy control employs the following operations:

* Fuzzy Negative $\mu(NOT\ A)(X)=1-\mu_A(X)$ In above formula, $\mu$ is defined as a Fuzzy membership function, and the letter A means a certain Fuzzy set and X is an element. For example, the formula $\mu_A(X)=0.3$ means that a membership for an element X to be a member of Set A is 0.3.

* Fuzzy AND logic

Fuzzy AND logic is generalized by T-norm and defined as follows:

T: $[0,1]\times[0,1]\rightarrow[0,1]$ (1) $T(x,1)=x, T(x,0)=0$ (boundary condition)
(2) IF $x1\leq x2$ THEN $T(x1,y)\leq T(x2,y)$ (monotonousness)
(3) $T(x,y)=T(y,x)$ (commutative law)
(4) $T\{x, T(y,z)\}=T\{T(x,y), z\}$ (associative law)

In other words, among operators that make two real numbers between 0 and 1 correspond two real numbers between 0 and 1, the above expressed operator is defined as T-norm that satisfies boundary condition, monotonousness, commutativeness and associativeness.

T-norm applied exemplarily is:

$\mu_{(A\ AND\ B)}(x)=MIN(\mu_A(x),\mu_B(x))$

This formula is called MIN operation and means that minimum value (worse value) of both is selected.

* Fuzzy OR logic

Fuzzy OR logic is generalized by S-norm and defined as follows:

s: $[0,1]\times[0,1]\rightarrow[0,1]$ (1) $S(x,1)=1, S(x,0)=x$
(2) IF $x1\leq x2$ THEN $S(x1,y)\leq S(x2,y)$
(3) $S(x,y)=S(y,x)$
(4) $S\{x, S(y,z)\}=S\{S(x,y), z\}$ S-norm applied exemplarily is:

$\mu_{(A\ OR\ B)}(X)=MAX(\mu_A(X), \mu_B(X))$

This formula is called as MAX operation and means that maximum value (better value) of both is selected.

* Fuzzy Relation

The method of obtaining a membership of Fuzzy relation is defined as follows:

$\mu_R(x,y)=MIN(\mu_A(x), \mu_B(Y))$

An important principle of Fuzzy theory is Fuzzy inference, concluding a new fact from already known dependence of effect on cause. Fuzzy inference is chiefly formed as a Fuzzy control rule (or inference rule), such as [IF (antecedent part), THEN (consequent part)]. And an antecedent part can be subdivided as [antecedent part 1 AND antecedent part 2], the AND used here means the AND used in Fuzzy AND logic. And above-mentioned antecedent clause is formed as [input=Linguistic value (or Fuzzy value or Fuzzy label].

(Pressure is HIGH)

One type of Fuzzy inference processing is a Max-Min Fuzzy inference that processes Fuzzy control rules by the use of Min-operation to make a conclusion of each rule, and by the use of Max-operation to make a conclusion for the complete set of rules. FIG. 1 illustrates a Max-Min Fuzzy inference process for two antecedent and one consequent variables system. In FIG. 1, supposing that x1 and x2 are defined as antecedent variables of a control rule, and y is a consequent variable, and there are n Fuzzy control rules:

* Fuzzy control rule #1:

If x1 is negative big AND x2 is zero THEN y is positive small.

* Fuzzy control rule #2:

If x1 is negative small AND x2 is negative small THEN y is positive big.

.
.
.

Fuzzy control rule #n:

If x1 is zero AND x2 is zero THEN y is positive big.

As shown in FIG. 1, if each input value is x1 or x2, every antecedent part of Fuzzy control rule has memberships respectively corresponding to each input value, x1 or x2.

If two antecedent memberships in every Fuzzy control rules are determined, respective consequent parts select minimum membership of both, in accordance with Fuzzy AND logic. Consequent membership functions of every Fuzzy control rule are illustrated as hatched part of right side of FIG. 1.

As described above, if conclusion membership functions of every Fuzzy control rule are determined, a conclusion for the complete set of rules are evaluated by composing these membership functions in accordance with Fuzzy OR logic, to become a final conclusion membership function as shown in right-lower side of FIG. 1.

Among methods for applying above-mentioned Fuzzy inference method to a Fuzzy controller, there has been proposed a method for realizing a Fuzzy inference method with computer software. Hereinbelow, a proposed method for realizing a Fuzzy inference method with computer software is illustrated.

FIG. 2 is a flow chart of the proposed method of Fuzzy inference. A computer receives data of an antecedent (Step 11), and determines memberships of input data (Step 12).

For example, in Fuzzy control rule #1 of FIG. 1, a degree for x1 to be a member of a set (i.e., a label, in this example of a set of 'negative big') can be determined by selecting a value corresponding to x1 in a membership function of a set, i.e., a label of 'negative big'.

After determining a membership of data, the proposed method determines a rule contribution of a Fuzzy control (Step 13).

A rule contribution (RC) is defined as a minimum value among memberships in a certain Fuzzy control rule.

i.e., RC=MIN (μ1, μ2)

Next, the proposed method determines a membership function of a conclusion part in accordance with RC (Step 14).

The proposed method adjusts the size of a conclusion membership function (e.g., 'y is a positive small' in Fuzzy control rule #1 in FIG. 1) corresponding to RC of a Fuzzy control rule.

In the Max-Min processing method, by cutting off a part of a consequent membership function (e.g., 'y is positive small') in accordance with RC of a Fuzzy control rule, a final conclusion membership function is obtained, and this processing is named a 'Min-process'.

On the other hand, in the Max-Product processing method, by scaling conclusion membership functions in accordance with RC of each Fuzzy control rule, a final conclusion membership function is obtained, and this processing is named a 'Product-process'.

Completing above-mentioned operations, a Fuzzy control rule is executed.

After operating a Fuzzy control rule in due sequence, the proposed method determines whether it is the last Fuzzy control rule (Step 15). If not, the proposed method operates next Fuzzy control rule (Step 16), and repeats the Steps 12–15.

The proposed method obtains conclusion membership functions of each Fuzzy control rules by repeating this process.

Finally, the proposed method obtains a final conclusion membership function by composing the conclusion membership functions in accordance with Fuzzy OR logic, and this process is called as Max-process (Step 17).

According to necessity, to obtain a discrete conclusion value, the proposed method executes a Fuzzy contrary operation (Step 18) and outputs a conclusion value (Step 19).

In a conventional method of digitizing a Fuzzy inference with a digital computer or digital hardware, this Fuzzy inferencing method has limited application in a controller system requiring rapid processing.

However, in conventional Max-Min method or Max-Product method, when two of Fuzzy control rules have a same label in consequent part, and each consequent membership functions in accordance with RC of each Fuzzy control rules is overlapping to each other, then, in evaluating a final conclusion membership function, an inference conclusion kth Fuzzy control rule whose membership function is small relatively is included into the other conclusion of mth Fuzzy control rule whose membership function is larger than that of kth Fuzzy control rule.

Consequently, although a calculation for obtaining a conclusion membership function of kthFuzzy control rule is not necessary because of an inference conclusion of mth Fuzzy control rule, the calculation, however, is performed, resulting in increased of processing time.

To obtain a conclusion membership function, the proposed method selects a conclusion membership value that is smaller than a condition membership, among conclusion memberships stored in memory (if a conclusion membership is 8 bits of data, there stored 256 of conclusion memberships), and establishes a conclusion membership function with the selected conclusion membership, so that a total 256 compare-calculating processes for every channel of the condition parts are to be executed.

As a result, excessive processing time is required. For example, if the consequent value (y) is 8 bits of data, the membership function, μ Y(y) representing each Fuzzy label of Y is composed of 256 membership grades, and to calculate the conclusion membership μ'Y(y), the 256 times Min-operations should be carried out.

$$\mu'Y(y)=\text{Min }(RC, \mu Y(y)), Y=1, 2, \ldots, 256$$

Since the above-mentioned operation is carried out for a redundant rule, the unnecessary time for calculation is spent calculating a number of redundant label.

SUMMARY OF THE INVENTION

An object of the present invention is to obviate disadvantages of the conventional method, by providing a Fuzzy inference method for improving Fuzzy inference speed by Max-process of rule contributions (RC) of Fuzzy control rules to avoid overlapping calculation when multiple control rules establish a common Fuzzy label.

To achieve this and other objects of the present invention, the inventive method of operating a Fuzzy Logic control system having a plurality of channels each representing a condition comprises the steps of receiving data corresponding to each of the plurality of channels; determining a condition membership for each channel based on the data; determining a rule contribution corresponding to each of a plurality of labels by selecting the smallest value among the condition memberships; executing a maximum operation by selecting the greatest value among the rule contributions; repeating the membership determining, rule contribution determining, and executing steps until a current control rule becomes a final control rule; determining a conclusion membership function based on a final rule contribution representing each label; and determining a final conclusion membership function based on each conclusion membership function.

DETAILED DESCRIPTION OF THE PREFERRED EMBODIMENT

The preferred embodiment of the present invention will now be described in detail with reference to the appended drawings.

Figure 1:
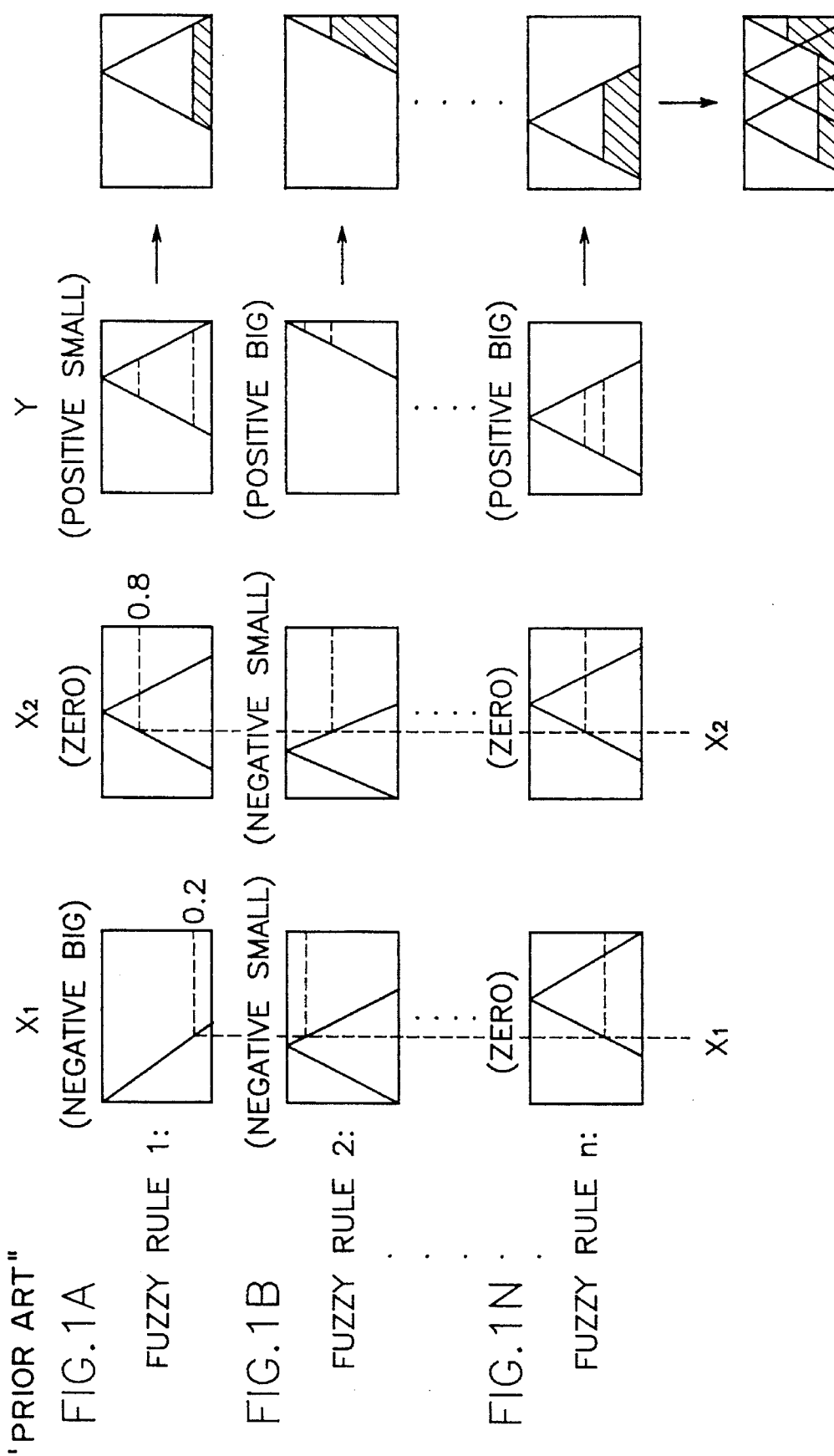
FIG. 1 illustrates max-Min Fuzzy inferring operation.
Figure 2:
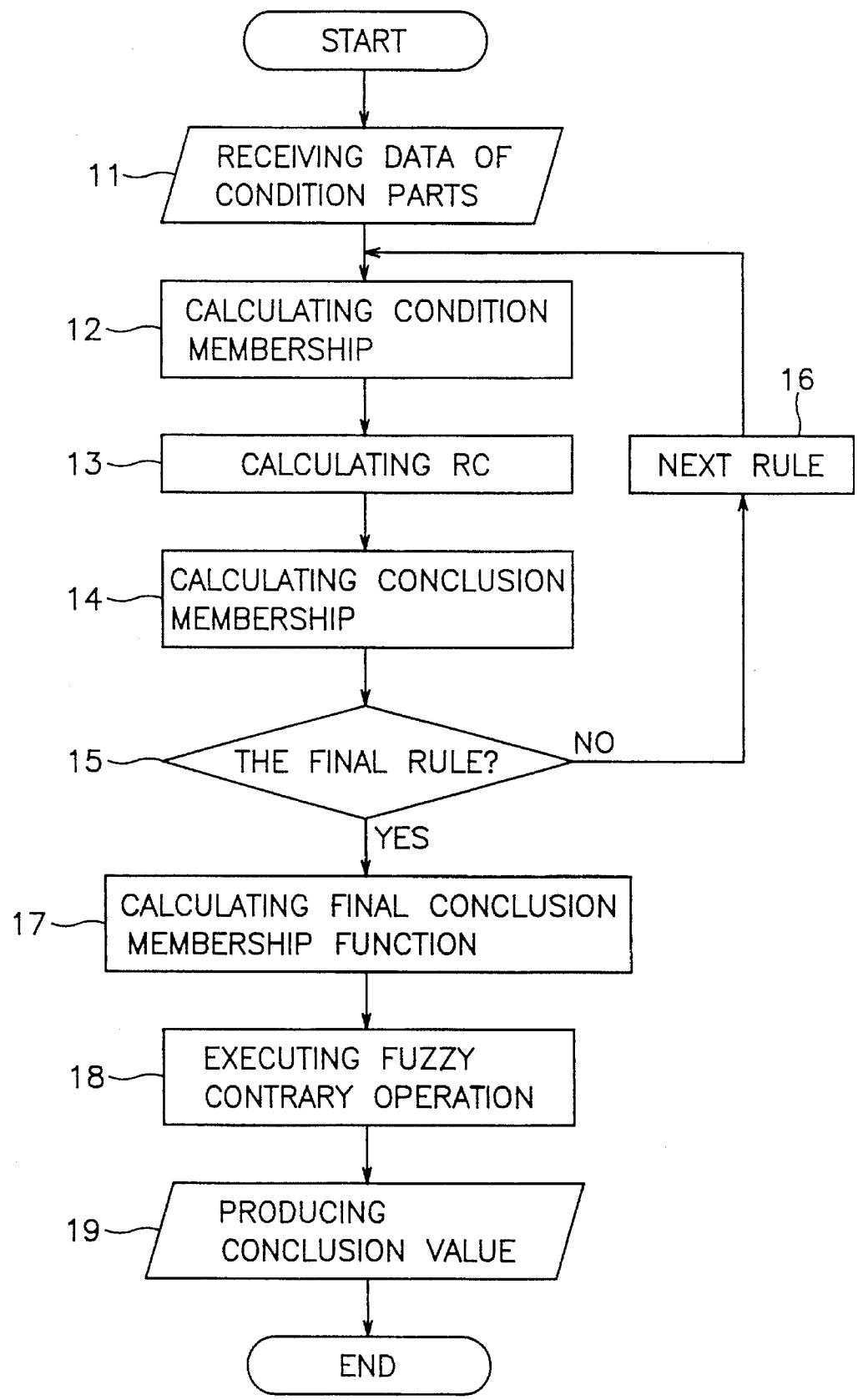
FIG. 2 is a flow chart of the conventional Fuzzy inference method.
Figure 3:
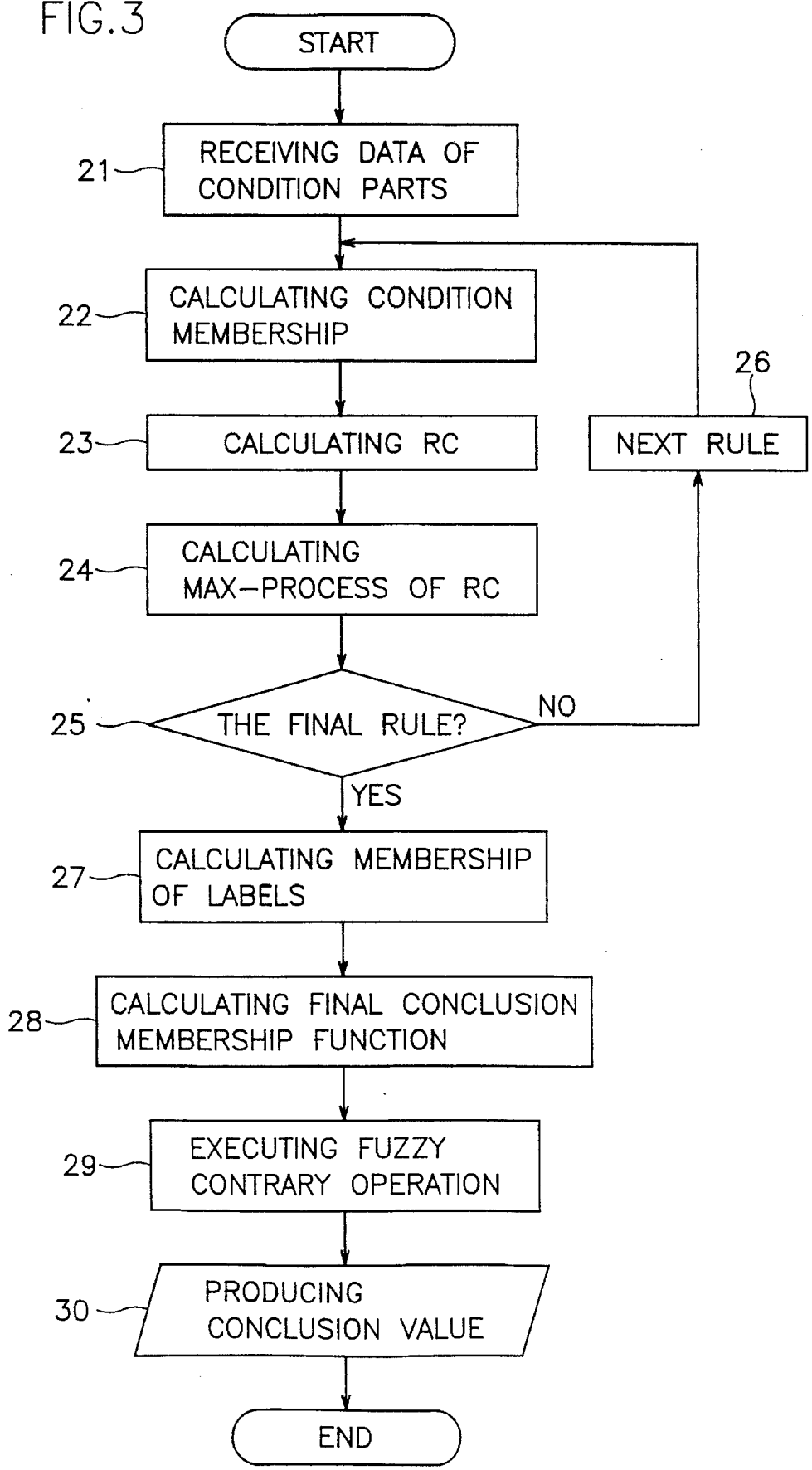
FIG. 3 is a flow chart of the Fuzzy inference method for improving inference speed in accordance with a preferred embodiment of the present invention.

FIG. 3 is a flow chart of the Fuzzy inference method for improving inference speed in accordance with the preferred embodiment of the present invention. Referring to Fuzzy control rules illustrated in FIG. 1, an operating flow of a Fuzzy inference method for improving inference speed according to the preferred embodiment of the present invention is illustrated hereinbelow as shown in FIG. 3. The preferred method receives data of a condition part (Step 21), and determines membership of inputted data (Step 22). After determining a membership of data, the preferred method determines RC's of Fuzzy controls (Step 23).

Figure 6:
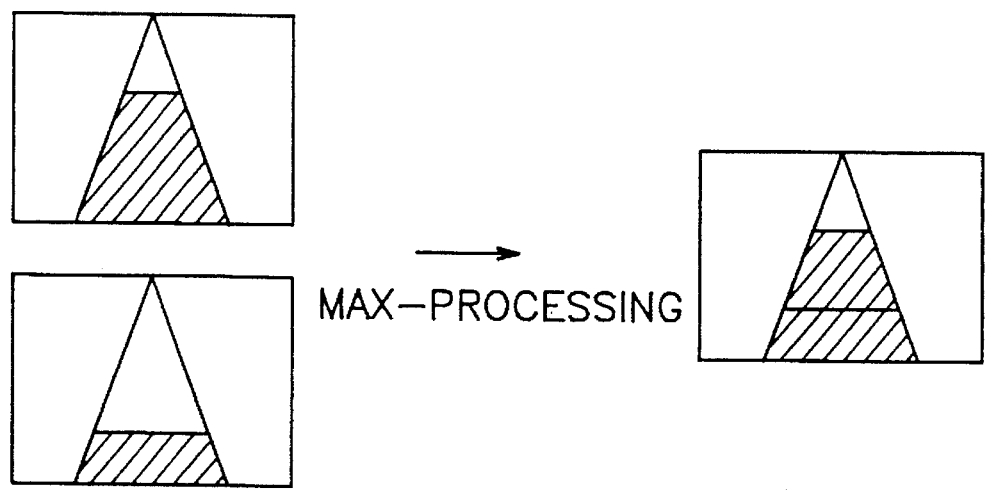
FIG. 6 is a diagram for illustrating the problems of overlapping calculations in accordance with the conventional Fuzzy inference method.

In accordance with the conventional fuzzy inference method and as can be seen in FIG. 6, to avoid the disadvantage of overlapping calculations, the preferred method executes Max-process (calculating RC)→Min-process (calculating label memberships)→Max-process (calculating a final conclusion membership function) instead of Min-process (calculating RC)→Max-process (calculating a final conclusion membership function).

In other words, in processing one of the Fuzzy control rules, after determining condition memberships and RC of Fuzzy control rules (Steps 22 and 23), the preferred method doesn't execute Min-process of a command RC of a Fuzzy label of conclusion part but executes Max-process of RC, replacing a current RC to commanded RC in case that a current RC is larger than previously commanded RC ($\alpha_{i,j}$) i.e., Max-process of Fuzzy label RC is executed. (Step 24)

Figure 4:
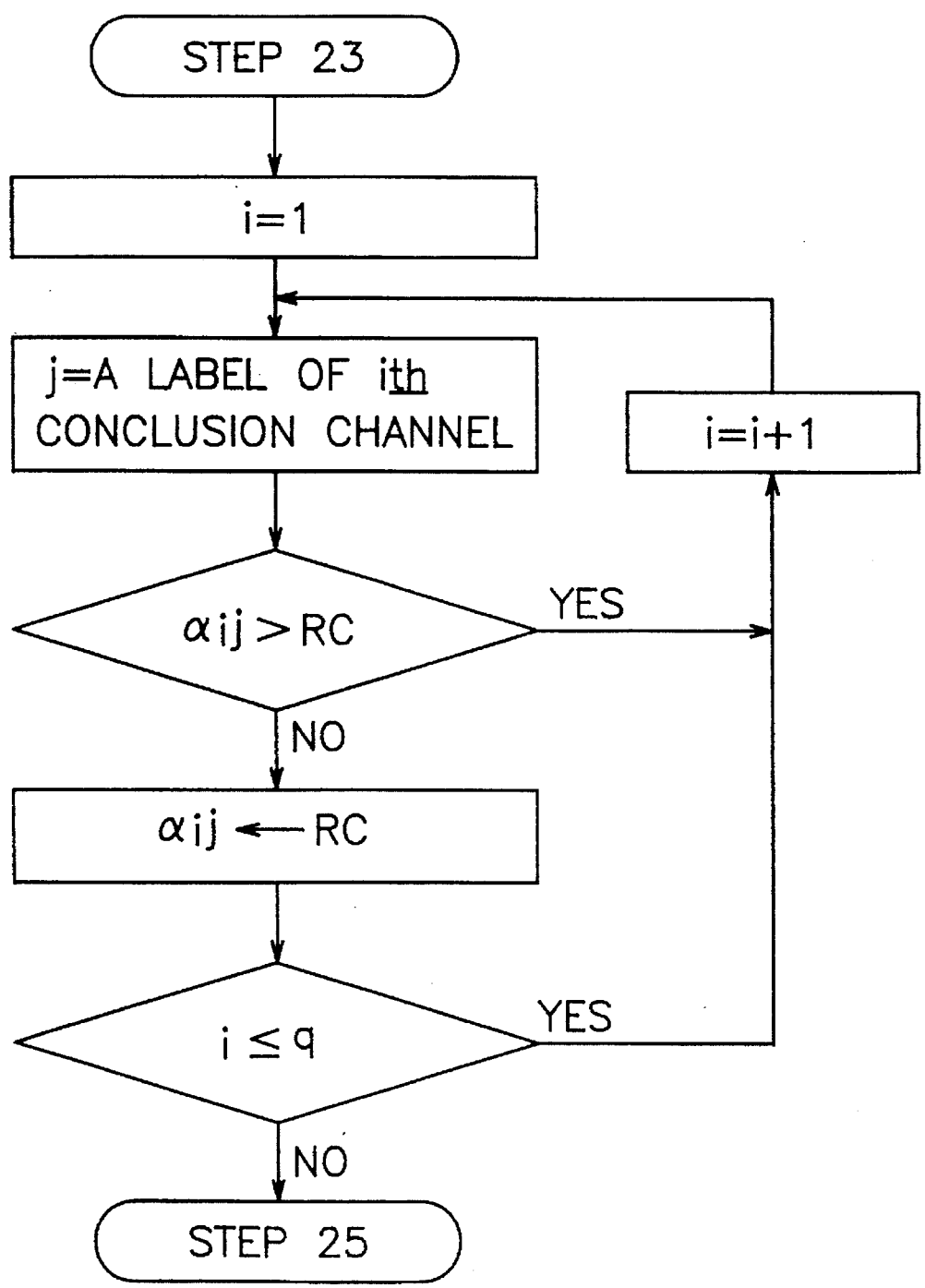
FIG. 4 is a flow chart of Max-processing steps of RC's for every Fuzzy label of FIG. 3.

As seen in FIG. 4, store every RC of Fuzzy labels, an RC matrix $\propto_{ij}$ is introduced. $\propto_{i,j}$:i=1, 2, ..., q (q is the number of channels of conclusion part) and j=1, 2, ..., 1 (1 is the number of established labels).

The preferred method executes Max-process of RC's of every Fuzzy labels (Step 24). And the preferred method determines whether current Fuzzy control rule is the last Fuzzy control rule, if not, the preferred method repeats the Steps 22–24 until current Fuzzy control rule become the last Fuzzy control rule (Step 26). So, in case that a common Fuzzy label is established in multiple conclusion parts, the preferred method can prevent conclusion membership functions of Fuzzy control rules from overlapping to each other in accordance with label RC of Fuzzy control rules.

Figure 5:
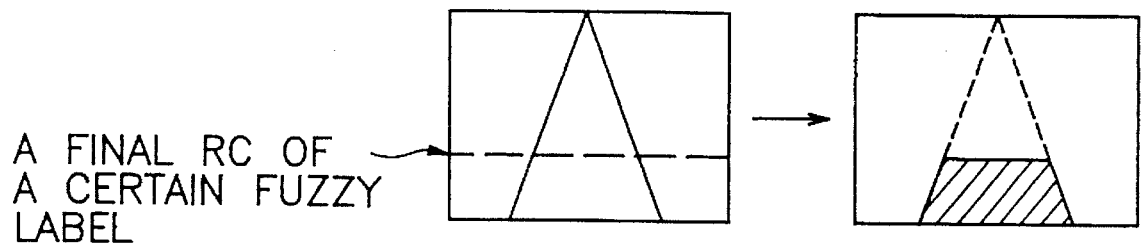
FIG. 5 illustrates an operating step of memberships of every label in accordance with the final RC of FIG. 3.

After completing Max-process of Fuzzy labels for every Fuzzy control rules, the preferred method determines memberships of every label in accordance with the final RC FIG. 5 illustrates operating step 27, and shows memberships of every label in accordance with the final RC.

If RC's of every labels are obtained and the preferred method executes Min-process of membership function of Fuzzy label with corresponding RC, i.e., cuts a part of the membership function, then the preferred method obtains as many membership functions as Fuzzy labels.

Next, by overlapping and Max-processing of conclusion membership functions, up to [the number of output channels]×[the number of labels], the preferred method obtains a final conclusion membership function (Step 28).

Thereafter, the preferred method executes Fuzzy contrary operation (Step 29), and finally outputs conclusion value (Step 30).

Accordingly, in the preferred embodiment, because Min-process is executed only once by maximum RC in a common label, the total processing time can be reduced especially when processing numerous Fuzzy control rules.

Further, because the conventional Max-Min Fuzzy method is replaced with Max-Min-Max Fuzzy method, and Max-Product Fuzzy method is also replaced with Max-Product-Max Fuzzy method, overlapping calculations are not executed.

Reduced processing time $\Delta t$ by the Fuzzy inference method of the invention is determined hereinbelow;

$$\Delta t = t_c \cdot q \cdot (2S-1) \cdot n + t_c \cdot q \cdot 1 \cdot (1-S)$$

where, $t_c$=time required in comparing both values, i.e., Max or Min operating time, q=the number of output channels of conclusion part, S=resolving power of output data, 1=the number of established labels, n=the number of Fuzzy control rules.

When the resolving power S is 256 and the number of output channels q is 7, if the number of Fuzzy control rules n is greater than 4, the processing speed can be improved through the improved algorithm of the present invention. Consequently, with this simple change in the processing structure of the Fuzzy inference algorithm, the processing time can be improved in proportion to the number of Fuzzy control rules.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A method of operating a Fuzzy Logic automatic controller for controlling a controlled system, said controller having a plurality of channels each representing a condition, the method comprising the steps of:

receiving data corresponding to each of said plurality of channels;

determining a condition membership for each channel based on said data;

determining a rule contribution corresponding to each of a plurality of labels by selecting a minimum value among said condition memberships;

executing a maximum operation by selecting a maximum value among said rule contributions;

repeating said membership determining, rule contribution determining, and executing steps until a current control rule becomes a final control rule;

determining a conclusion membership function based on a final rule contribution representing each label;

determining a final conclusion membership function based on each conclusion membership function; and utilizing said final conclusion membership function to control the controlled system.

2. The method according to claim 1, wherein said executing step includes using a rule contribution matrix including elements $\propto_{i,j}$:i=1, 2, ..., q where q is the number of channels of conclusion parts; and j=1, 2 ..., 1 where 1 is the number of labels.

3. The method according to claim 1, further comprising the steps of:

executing a Fuzzy contrary operation of said final conclusion membership function; and determining a conclusion value from said Fuzzy contrary operation.

\* \* \* \* \*

UNITED STATES PATENT AND TRADEMARK OFFICE
CERTIFICATE OF CORRECTION

PATENT NO. : 5,572,629
DATED : November 05, 1996
INVENTOR(S) : Sung-kuk CHOI

It is certified that error appears in the above-indentified patent and that said Letters Patent is hereby corrected as shown below:

In the Abstract, line 5, "channels" should read --channel--.

In the Abstract, line 7, "labels" should read --label--.

In the Abstract, line 10, "labels" should read --label--.

* In the Specification, column 5, line 29, "$\propto$" should read --$\alpha$--. (Both Occurrences)

* In Claim 2, column 6, line 56, "$\propto$" should read --$\alpha$--.

* In Claim 2, column 6, line 57, "1 where 1" should read --$\ell$ where $\ell$--.

Signed and Sealed this

Twentieth Day of May, 1997

Attest:

BRUCE LEHMAN

*Attesting Officer*    *Commissioner of Patents and Trademarks*